(12) United States Patent
Song et al.

(10) Patent No.: US 11,774,767 B1
(45) Date of Patent: Oct. 3, 2023

(54) DIFFRACTIVE OPTICAL WAVEGUIDE AND DISPLAY DEVICE

(71) Applicant: JIAXING UPHOTON OPTOELECTRONICS TECHNOLOGY CO., LTD., Jiaxing (CN)

(72) Inventors: Yuming Song, Beijing (CN); Chenhao Dou, Beijing (CN); Kehan Tian, Beijing (CN)

(73) Assignee: JIAXING UPHOTON OPTOELECTRONICS TECHNOLOGY CO., LTD., Jiaxing (CN)

( * ) Notice: Subject to any disclaimer, the term of this patent is extended or adjusted under 35 U.S.C. 154(b) by 0 days.

(21) Appl. No.: 18/089,358

(22) Filed: Dec. 27, 2022

(30) Foreign Application Priority Data

Jul. 21, 2022 (CN) .......................... 202210856430.8

(51) Int. Cl.
*G02B 27/00* (2006.01)
*G02B 27/01* (2006.01)
*G02B 27/44* (2006.01)

(52) U.S. Cl.
CPC ..... *G02B 27/0172* (2013.01); *G02B 27/0081* (2013.01); *G02B 27/44* (2013.01); *G02B 2027/0178* (2013.01)

(58) Field of Classification Search
CPC ........... G02B 27/0081; G02B 27/0172; G02B 27/44; G02B 2027/0178
See application file for complete search history.

(56) References Cited

U.S. PATENT DOCUMENTS

2020/0159023 A1\* 5/2020 Bhargava ........... G02B 27/4272
2020/0166691 A1\* 5/2020 Vartiainen .......... G02B 27/4272
(Continued)

FOREIGN PATENT DOCUMENTS

CN 110520763 A 11/2019
CN 110869834 A 3/2020
(Continued)

*Primary Examiner* — Ryan A Lubit
(74) *Attorney, Agent, or Firm* — BakerHostetler (57) ABSTRACT

The present application provides a diffractive optical waveguide for optical pupil expansion and a display device. The diffractive optical waveguide comprises a waveguide substrate having a coupling-in region and a coupling-out region that includes a first coupling-out region, a second coupling-out region, and a transitional region; a coupling-in grating; and a coupling-out grating. The coupling-out grating comprises first and second coupling-out gratings and a plurality of transitional coupling-out grating. The first and second coupling-out gratings are arranged in a first direction. The transitional region comprises a plurality of sub-regions each correspondingly provided with one of transitional coupling-out gratings. The transitional coupling-out grating has a first, a second, and a third vector direction. The third vector direction is parallel to the vector direction of the first coupling-out grating. The first vector direction forms a first included angle with the third vector direction, and the second vector direction forms a second included angle with the third vector direction. The first included angle corresponding to the one, in two neighboring transitional coupling-out gratings, closer to the second coupling-out grating is greater than the first included angle corresponding to the farther one; and/or, the second included angle corresponding to the one closer to the second coupling-out grating is greater than the second included angle corresponding to the farther one.

16 Claims, 4 Drawing Sheets

(56) References Cited

U.S. PATENT DOCUMENTS

| | | | |
|---|---|---|---|
| 2021/0132390 A1* | 5/2021 | Lin | G02B 6/0076 |
| 2021/0165142 A1* | 6/2021 | Blomstedt | G02B 27/0172 |
| 2021/0191180 A1* | 6/2021 | Malhotra | C08L 67/00 |
| 2022/0128744 A1* | 4/2022 | Bohn | G02B 27/0103 |

FOREIGN PATENT DOCUMENTS

| | | |
|---|---|---|
| CN | 212694109 U | 3/2021 |
| CN | 113777703 A | 12/2021 |
| CN | 113970851 A | 1/2022 |
| CN | 114545549 A | 5/2022 |
| WO | WO 2021/252672 A1 | 12/2021 |
| WO | WO 2022/049104 A1 | 3/2022 |
| WO | WO 2022/115580 A1 | 6/2022 |

\* cited by examiner

DIFFRACTIVE OPTICAL WAVEGUIDE AND DISPLAY DEVICE

CROSS-REFERENCE TO RELATED APPLICATION

The present application claims priority to Chinese Patent Application No. 202210856430.8, filed on Jul. 21, 2022, which is hereby incorporated by reference in its entirety.

BACKGROUND

The present application generally relates to the technical field of diffractive optics, and more specifically to a diffractive optical waveguide and a display device.

With the high development of semiconductor technology, the way of interaction between human and computer is developing rapidly, and Augmented Reality (AR) display, among others, can provide multidimensional information to human beings and has been widely concerned. AR glasses are one of the important mediums in the field of augmented reality display. The diffractive optical waveguide has the advantages of allowing production with high ability for mass production and a light, thin form, and is gradually approved in the field of AR display, being expected to become the mainstream technology development direction of AR field in the future. The coupling-out grating is one of the essential components of the diffractive optical waveguide.

In order to achieve a larger FOV (Field of View) along with better non-uniformity and higher efficiency for traditional coupling-out grating, it is typically needed that the coupling-out grating may be designed to have a certain two-dimensional grating region for pupil expansion (improving non-uniformity potential), and a certain one-dimensional grating region on the sides of the two-dimensional grating region for improved efficiency.

However, there is a large difference in coupling-out efficiency between the one-dimensional and two-dimensional regions, and the factor of the difference typically can be more than 3 times, and even reach more than 6 times. This leads to the problem that the coupling-out strength of the two-dimensional region in the middle and the one-dimensional region on its sides are quite different, resulting in clear demarcation from bright to dark to bright areas, which is undesired to the non-uniformity index, and is also undesired for viewing by human eyes.

Therefore, it is necessary to improve the diffractive optical waveguide and display device to solve at least one technical problem.

SUMMARY

The present application is proposed to solve at least one of the above-mentioned problems. Specifically, the first aspect of the present application provides a diffractive optical waveguide for optical pupil expansion, comprising:

a waveguide substrate comprising a coupling-in region and a coupling-out region, wherein the coupling-out region includes a first coupling-out region, a second coupling-out region, and a transitional region, and the transitional region is disposed between the first coupling-out region and the second coupling-out region;

a coupling-in grating disposed on or in the waveguide substrate and located in the coupling-in region and configured to couple input light into the waveguide substrate to cause the light to propagate within the waveguide substrate through total reflection;

a coupling-out grating disposed on or in the waveguide substrate and located in the coupling-out region and configured to couple at least a portion of light propagating therein out of the waveguide substrate by diffraction, wherein, the coupling-out grating comprises a first coupling-out grating disposed in the first coupling-out region, a second coupling-out grating disposed in the second coupling-out region, and a plurality of transitional coupling-out gratings disposed in the transitional region; the first coupling-out grating includes a one-dimensional grating, the second coupling-out grating includes a two-dimensional grating, and the first coupling-out grating and the second coupling-out grating are arranged in a first direction; the transitional region comprises a plurality of sub-regions, and each sub-region is correspondingly provided with one of the transitional coupling-out gratings, wherein each of the transitional coupling-out gratings has a first vector direction, a second vector direction, and a third vector direction; the third vector direction of each of the transitional coupling-out gratings is parallel to the vector direction of the first coupling-out grating; the first vector direction and the third vector direction form a first included angle; the second vector direction and the third vector direction form a second included angle; in any two neighboring transitional coupling-out gratings in a direction parallel to the first direction, the first included angle corresponding to the one closer to the second coupling-out grating is greater than the first included angle corresponding to the farther one; and/or, in any two neighboring transitional coupling-out gratings in a direction parallel to the first direction, the second included angle corresponding to the one closer to the second coupling-out grating is greater than the second included angle corresponding to the farther one.

Alternatively, the second coupling-out grating has a first length in the first direction in its vicinity to the coupling-in grating, and the coupling-in grating has a second length in the first direction, wherein the first length is not less than the second length.

Alternatively, the third vector direction forms a predetermined angle with the second direction. The first vector direction of each of the transitional coupling-out gratings forms a first angle with the second direction. The second vector direction of each of the transitional coupling-out gratings forms a second angle with the second direction, wherein the second direction is perpendicular to the first direction, the first angle is not greater than the predetermined angle and is greater than 10 degrees, and the second angle is less than 120 degrees and is not less than the predetermined angle.

Alternatively, in any two neighboring transitional coupling-out gratings in a direction parallel to the first direction, the first angle corresponding to the one closer to the second coupling-out grating is smaller than the first angle corresponding to the farther one, and/or, in any two neighboring transitional coupling-out gratings in a direction parallel to the first direction, the second angle corresponding to the one closer to the second coupling-out grating is greater than the second angle corresponding to the farther one.

Alternatively, the first angle is not greater than the predetermined angle and is greater than 30 degrees.

Alternatively, the first coupling-out grating comprises a plurality of grating lines. Each of the transitional coupling-out gratings is composed of a plurality of periodic structures in periodical arrangement. Each of the periodic structures comprises a first grating feature and a second grating feature connected to the first grating feature, wherein the first grating feature has a first width in a direction parallel to the first vector direction and the second grating feature has a second width in a direction parallel to the second vector direction.

Alternatively, the first width is 0.7 times to 1.3 times the line width of the grating lines;

the second width is 0.7 times to 1.3 times the line width of the grating lines.

Alternatively, the shape of the second coupling-out region is any one of: a rectangle, a trapezoid, an isosceles triangle, or a combination of a trapezoid and a rectangle.

Alternatively, the second coupling-out region is chamfered at a first edge in its vicinity to the coupling-in grating; and/or the second coupling-out region further has a second edge opposite to the first edge, and the second coupling-out region is chamfered at the second edge; and/or at least one edge of the second coupling-out region is a curved edge.

Alternatively, the number of the first coupling-out region is two. The two first coupling-out regions are disposed on either side of the second coupling-out region. The transitional region is provided between each first coupling-out region and the second coupling-out region.

Alternatively, the two first coupling-out regions are symmetrical about a central axis of the second coupling-out region, and the central axis is perpendicular to the first direction.

Alternatively, the transitional coupling-out grating comprises a plurality of grating polylines, and each of the grating polylines comprises a plurality of periodic structures in continuous and connected arrangement. At least one edge of the periodic structures is a non-linear edge. The shape of the non-linear edge is one of: a polyline, an arc, or a combination of a straight line and an arc.

The second aspect of the present application provides a display device, comprising:

the diffractive optical waveguide of the first aspect, an optical machine, and an actuating device, wherein the actuating device is configured to actuate the optical machine to project image light onto the coupling-in grating of the diffractive optical waveguide.

Alternatively, an optical axis of the image light projected by the optical machine is perpendicular to a surface of the waveguide substrate of the diffractive optical waveguide.

Alternatively, the display device is a near-eye display device, comprising:

a lens and a frame for holding the lens near eyes, the lens including said diffractive optical waveguide.

Alternatively, the display device is an augmented reality display device or a virtual reality display device.

In the diffractive optical waveguide used for optical pupil expansion of the present application, it is possible to form coupling-out graded from bright to dark area with the transitional coupling-out grating, such that the transition between the outermost one-dimensional grating and the middle two-dimensional grating is more natural, which does not produce a clear demarcation line for bright and dark areas and achieves the technical effect of high efficiency and good non-uniformity simultaneously. Further, it makes human eyes feel a more moderate change in brightness of light in different incident directions and brighter light in the field of view with wearing an optical waveguide display device, while avoiding a significant change in the brightness change of the image observed by the human eyes moving in the eye box of the diffractive optical waveguide. This improves the display effect of the display device having the diffractive optical waveguide, and thereby improves the user's experience.

Since the display device of the present application comprises the aforementioned diffractive optical waveguide, it has substantially the same advantages as the diffractive optical waveguide.

BRIEF DESCRIPTION OF THE DRAWINGS

In order to illustrate the technical solutions in the embodiments of the present application more clearly, the following briefly introduces the drawings that need to be used in the description of the embodiments. Apparently, the drawings described in the following are only some embodiments of the present application. For those of ordinary skilled in the art, other drawings can also be obtained from these drawings without creative work.

DETAILED DESCRIPTION

In order to make the objectives, technical solutions and advantages of the present application more apparent, the exemplary embodiments according to the present application will be described in detail below with reference to the accompanying drawings. Apparently, the described embodiments are only a part of the embodiments of the present application, rather than all the embodiments of the present application, and it should be understood that the present application is not limited by the example embodiments described herein. Based on the embodiments of the present application described herein, all other embodiments obtained by those skilled in the art without creative work shall fall within the protection scope of the present application.

In the following description, numerous specific details are set forth in order to provide a more thorough understanding of the present application. However, it is obvious to those skilled in this art that the present application may be implemented without one or more of these details. Some technical features well-known in this art are not described in other examples in order to avoid confusion with the present application.

It is to be understood that the present application can be implemented in various forms but should not be construed as being limited to the embodiments set forth herein. On the contrary, these embodiments are provided to make the disclosure thorough and complete and the scope of the application be completely delivered to those skilled in the art.

The use of the terms provided herein is intended merely to illuminate the embodiments and does not pose a limitation on the application. When they are used herein, the terms "a", "an" and "the" in the singular form are also intended to include the plural, unless otherwise indicated herein. It should still be understood that the terms "comprising" and/or "including" are used in the description to determine the presence of the features, integers, steps, operations, elements and/or components but not to exclude the presence or addition of one or more other features, integers, steps, operations, elements, components and/or groups. When they are used herein, the terms "and/or" include any or all combinations of related listed items.

In order to understand the present application thoroughly, a detailed structure is provided in the following description so as to elucidate the technical solutions presented in the present application. Alternative embodiments of the present application are illustrated in detail as below. However, the present application may further have other embodiments in addition to these detailed descriptions.

In order to solve the aforementioned technical problem, the present application provides a diffractive optical waveguide for optical pupil expansion. The first aspect of the present application provides a diffractive optical waveguide for optical pupil expansion, comprising: a waveguide substrate including a coupling-in region and a coupling-out region, wherein the coupling-out region includes a first coupling-out region, a second coupling-out region, and a transitional region, and the transitional region is disposed between the first coupling-out region and the second coupling-out region; a coupling-in grating disposed on or in the waveguide substrate and located in the coupling-in region and configured to couple input light into the waveguide substrate to cause the light to propagate within the waveguide substrate through total reflection; a coupling-out grating disposed on or in the waveguide substrate and located in the coupling-out region and configured to couple at least a portion of light propagating therein out of the waveguide substrate by diffraction, wherein the coupling-out grating comprises a first coupling-out grating disposed in the first coupling-out region, a second coupling-out grating disposed in the second coupling-out region, and a plurality of transitional coupling-out gratings disposed in the transitional region; wherein the first coupling-out grating includes a one-dimensional grating, and the second coupling-out grating includes a two-dimensional grating, and the first coupling-out grating and the second coupling-out grating are arranged along a first direction; wherein the transitional region comprises a plurality of sub-regions, and each sub-region is correspondingly provided with one type of the transitional coupling-out gratings, wherein each of the transitional coupling-out gratings includes a first vector direction, a second vector direction, and a third vector direction; the third vector direction of each of the transitional coupling-out gratings is parallel to the vector direction of the first coupling-out grating; the first vector direction and the third vector direction form a first included angle; the second vector direction and the third vector direction form a second included angle; in any two neighboring transitional coupling-out gratings in a direction parallel to the first direction, the first included angle corresponding to the one closer to the second coupling-out grating is greater than the first included angle corresponding to the farther one, and/or, in any two neighboring transitional coupling-out gratings in a direction parallel to the first direction, the second included angle corresponding to the one closer to the second coupling-out grating is greater than the second included angle corresponding to the farther one.

In the diffractive optical waveguide used for optical pupil expansion of the present application, it is possible to form coupling-out graded from bright to dark area with the transitional coupling-out grating, such that the transition between the outermost one-dimensional grating and the middle two-dimensional grating is more natural, which does not produce a clear demarcation line for bright and dark areas and achieves the technical effect of high efficiency and good non-uniformity simultaneously.

The diffractive optical waveguide and the display device of the present application will be described below with reference to FIGS. 1 to 8. The features of the various embodiments of the present application may be combined with each other without conflict.

Figure 1:
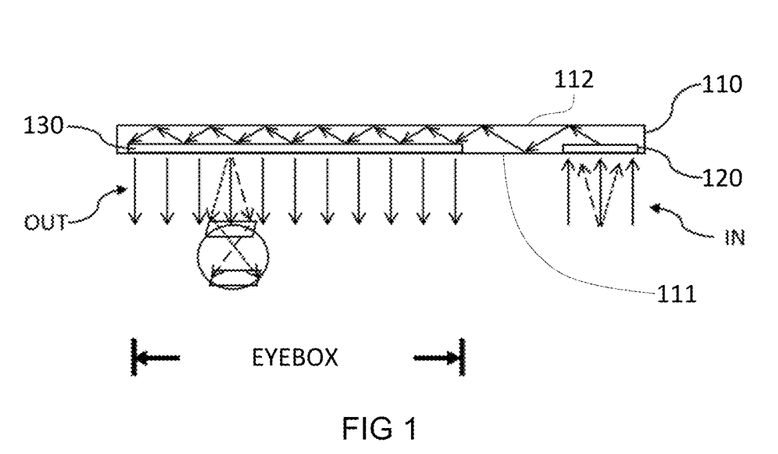
FIG. 1 shows a schematic diagram of a diffractive optical waveguide according to a preferred embodiment of the present application.
Figure 2:
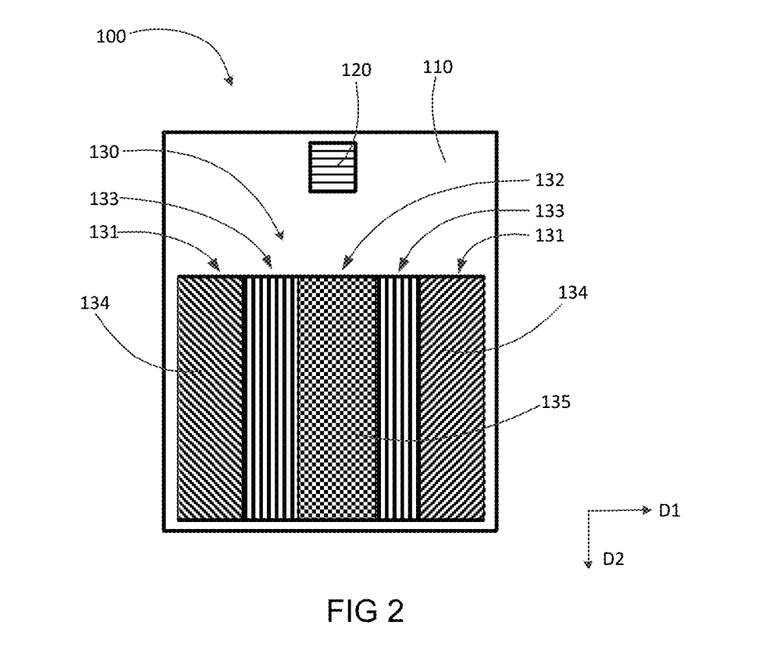
FIG. 2 shows a schematic diagram in another view of the diffractive optical waveguide according to a preferred embodiment of the present application.

The present application provides a diffractive optical waveguide 100 for optical pupil expansion, and FIG. 1 and FIG. 2 illustratively show an example of the diffractive optical waveguide 100 for optical pupil expansion according to an embodiment of the present invention, namely the diffractive optical waveguide 100. As shown in FIGS. 1 and 2, the diffractive optical waveguide 100 comprises a waveguide substrate 110. The waveguide substrate 110 can be made of glass, optical plastic, or other optical transmission materials.

Alternatively, the waveguide substrate 110 can have first and second substantially flat surfaces 111, 112, wherein the first surface 111 is opposite to the second surface 112, wherein the first surface 111 can be the surface of the display device with the waveguide substrate 110 on the side facing the viewer's eyes. With the waveguide substrate 110, light may propagate in a direction substantially parallel to the first surface 111 and the second surface 112 through total internal reflection.

Alternatively, the shape of the waveguide substrate 110 can be any suitable shape, for example, a rectangle, a dumbbell shape, a butterfly shape, or the like. The thickness of the waveguide substrate 110 can be any suitable thickness, for example, the thickness of the waveguide substrate 110 is greater than or equal to 0.4 mm, and is less than or equal to 2 mm. The waveguide substrate 110 in this thickness range can provide good optical properties without being too thick or heavy to impact the user's experience. It is worth mentioning that the thickness of the waveguide substrate 110 can be the dimension of the waveguide substrate 110 in a direction substantially perpendicular to the first surface 111 and the second surface 112.

Alternatively, the waveguide substrate 110 comprises a coupling-in region and a coupling-out region. The diffractive optical waveguide 100 of the present application further comprises a coupling-in grating 120 and a coupling-out grating 130. The coupling-in grating 120 and the coupling-out grating 130 can be located on the same side of the waveguide substrate 110, for example, both are disposed on the first surface 111 of the waveguide substrate 110, or located on either side, i.e., on the first surface 111 and the second surface 112, respectively.

Wherein, the coupling-in grating 120 is disposed on or in the waveguide substrate 110 and located in the coupling-in region, and is configured to couple-in input light into the waveguide substrate 110 to cause it to propagate within the waveguide substrate 110 through total reflection, such that the light propagates to the coupling-out grating.

The coupling-in grating 120 can be a one-dimensional grating, such as a linear grating (also referred to as a ruled grating), or a slanted grating, a non-blazed grating, and other suitable types of gratings, or the coupling-in grating 120 can also be a metasurface coupling-in structure. In some examples, the coupling-in grating 120 is a one-dimensional grating, a two-dimensional grating, or is formed by two gratings with different grating vectors joined together.

The coupling-in grating 120 can be an optical element including a periodic structure, which can be fabricated by any suitable microfabrication process. For example, the grating can be fabricated on the surface or inside of the waveguide substrate 110 by photolithography or on the waveguide substrate 110 by nanoimprint lithography, thereby forming a surface relief diffraction grating. Alternatively, the period of the coupling-in grating 120 can be 350 nm to 600 nm, or other suitable period lengths.

The coupling-out grating is disposed on or in the waveguide substrate and located in the coupling-out region. The coupling-out grating is used to couple-out at least a portion of the light propagating therein from the waveguide substrate by diffraction for coupling-out light into the viewer's eyes. When the light entering the coupling-in grating 120 is, for example, image light projected by a projector, the light coupled out from the coupling-out grating 130 is at least a portion of the image light, and the portion of the image light is guided to the viewer's eyes through the coupling-out grating 130 so that the image projected by the projector is visible to the viewer's eyes. Wherein, the coupling-out grating 130 plays the role of pupil expansion. After the coupling-out grating 130 receiving a relatively thin incident light beam from the coupling-in grating, the coupling-out grating continuously diffracts and expands the light beam in two directions in a plane while partially couples-out the light from the waveguide substrate for the purpose of optical pupil expansion in the plane, so that the viewer can observe the display information carried by the incident light beam in a relatively large eyebox (EB).

In some embodiments, the coupling-out grating can be fabricated by any suitable microfabrication process. For example, the grating can be fabricated on the surface or inside of the waveguide substrate 110 by photolithography or on the waveguide substrate 110 by nanoimprint lithography, thereby forming a surface relief diffraction grating. It is worth mentioning that various shapes of gratings shown in this application are the shapes on the top surfaces of the gratings parallel to the surface of the optical waveguide (i.e., the surface on which the coupling-out grating or the coupling-in grating 120 is disposed), the shapes can be cross-sectional shapes taken in a plane substantially parallel to the surface of the optical waveguide, or can be projection shapes projected on a plane parallel to the surface of the optical waveguide.

With further reference to FIG. 2, the coupling-out region of the diffractive optical waveguide 100 of the present application comprises a first coupling-out region 131, a second coupling-out region 132 and a transitional region 133. The transitional region 133 is located between the first coupling-out region 131 and the second coupling-out region 132. In a preferred embodiment, the first coupling-out region 131 is located at the outermost side, or on the sides of the coupling-out region in the first direction D1. The transitional region 133 is connected to the first coupling-out region 131 and is located on the inner side of the first coupling-out region 131. The second coupling-out region 132 is connected to the transitional region 133 and is located on the inner side of the transitional region 133.

It can be understood that in the above embodiment the number of the first coupling-out region 131 is two. Therefore, the two first coupling-out regions 131 are respectively disposed on both sides of the second coupling-out region 132. The transitional region 133 is disposed between each first coupling-out region 131 and the second coupling-out region 132.

Further, it is preferred that the two first coupling-out regions 131 are symmetrical with respect to the central axis of the second coupling-out region 132. The central axis is perpendicular to the first direction D1 or is parallel to the second direction D2. In other words, the central axis of the waveguide substrate 110 can also generally run through the center of the coupling-in region. The second coupling-out region 132 is axisymmetric with respect to the central axis. The two first coupling-out regions 131 are axisymmetric with respect to the central axis, and the transitional regions 133 on the sides of the second coupling-out region 132 are also axisymmetric with respect to the central axis.

The coupling-out grating of the present application can comprise a first coupling-out grating 134, a second coupling-out grating 135 and a plurality of transitional coupling-out gratings. The first coupling-out grating 134 is correspondingly disposed in the first coupling-out region 131. The second coupling-out grating 135 is correspondingly disposed in the second coupling-out region 132. The plurality of transitional coupling-out gratings are correspondingly disposed in the transitional region 133. The first coupling-out grating 134 and the second coupling-out grating 135 are arranged in the first direction D1. Thus, in the first direction D1, the coupling-out grating can sequentially comprise the first coupling-out grating 134, the plurality of transitional coupling-out gratings, the second coupling-out grating 135, the plurality of transitional coupling-out gratings, and the first coupling-out grating 134.

Exemplarily, the transitional region 133 comprises a plurality of sub-regions, and each sub-region is correspondingly provided with one transitional coupling-out grating. For example, the first transitional coupling-out grating 136, the second transitional coupling-out grating 137, the third transitional coupling-out grating 138, the fourth transitional coupling-out grating 139 and the fifth transitional coupling-out grating 140 are sequentially arranged in the first direction D1 in FIG. 3. Or, in other examples, the number of the plurality of sub-regions may also be other suitable numbers. Alternatively, the area of the transitional region can also be divided in the second direction D2. Alternatively, the first direction D1 and the second direction D2 are different directions, for example, the first direction D1 and the second direction D2 can be perpendicular to each other.

Figure 3:
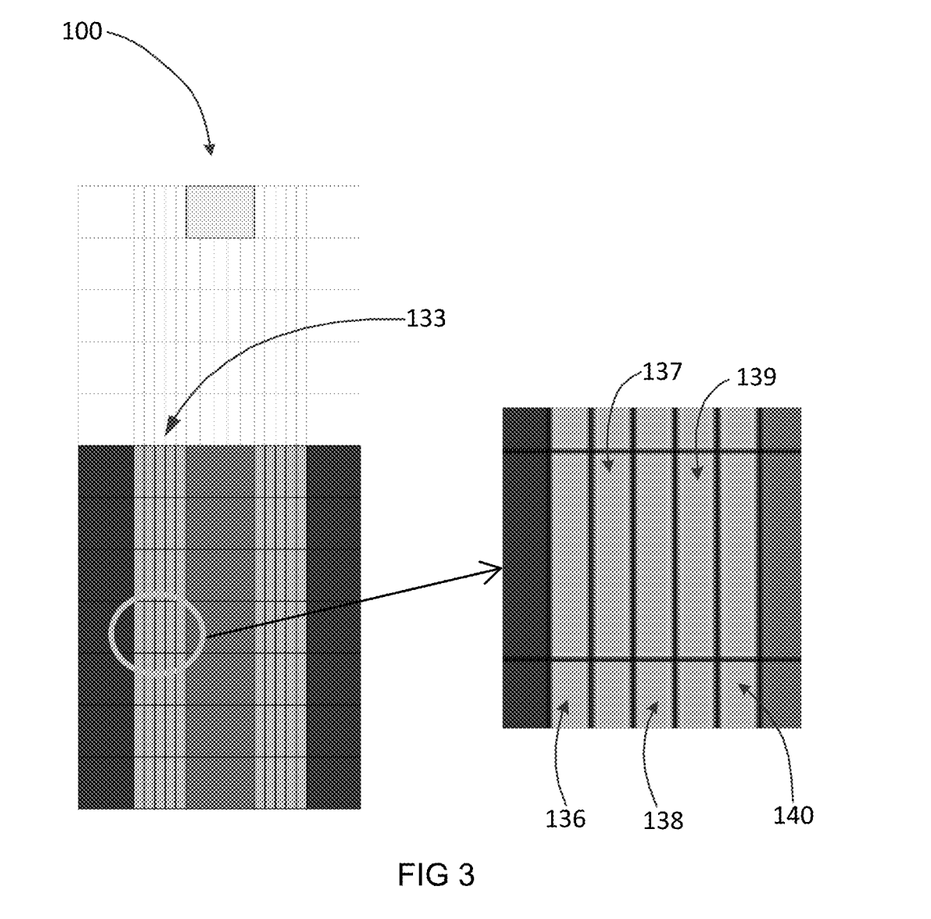
FIG. 3 shows a partially enlarged schematic diagram of the diffractive optical waveguide in FIG. 2.

Wherein, the first coupling-out grating 134 comprises a one-dimensional grating. The one-dimensional grating can be formed as a protrusion on the surface of the waveguide substrate 110, and the height of the protrusion can be reasonably set according to actual needs. The one-dimensional grating may comprise a plurality of periodic structures, for example, the one-dimensional grating can be composed of a plurality of grating lines. Each of the grating lines can be continuously connected by a plurality of periodic structures.

The second coupling-out grating 135 comprises a two-dimensional grating. The two-dimensional grating structure comprises a plurality of two-dimensional periodic structures. The two-dimensional periodic structure of the two-dimensional grating can be in the shape of a polygon, such as a quadrilateral, a pentagon, a hexagon, and other polygons, etc., and may also be a triangle or Reuleaux Triangle.

The transitional coupling-out grating can consist of a plurality of periodic structures in periodical arrangement. For example, the transitional coupling-out grating may comprise a plurality of grating polylines, and each of the grating polylines comprises a plurality of periodic structures in continuous and connected arrangement. Alternatively, at least one edge of the periodic structures is a non-linear edge, and the shape of the non-linear edge is one of the shapes of: a polyline, an arc, or a combination of a straight line and an arc. Apparently, the transitional coupling-out grating is a transitional structure from one-dimensional grating to two-dimensional grating. The transitional coupling-out grating is transformed into the one-dimensional grating at the limit in the direction toward the one-dimensional grating and transformed into the two-dimensional grating when at the limit in the direction toward the two-dimensional grating.

In the present application, the first coupling-out grating 134 has one vector direction. Each of the transitional coupling-out gratings has three vector directions, i.e., a first vector direction 141, a second vector direction 142 and a third vector direction 143. The third vector direction 143 of each of the transitional coupling-out gratings is the same as the vector direction of the first coupling-out grating 134, for example, the third vector direction 143 of each of the transitional coupling-out gratings is the same as the vector direction of the first coupling-out grating 134 adjacent thereto. The first vector direction 141 forms a first included angle with the third vector direction 143, and the second vector direction 142 forms a second included angle with the third vector direction 143.

It is worth mentioning that the vector direction is also referred to as "grating vector" in this application. This direction is parallel to a direction in which the periodical change/arrangement of the grating structure runs (e.g., perpendicular to the grating rulings/grooves), and is identical to the propagation direction of the positive first order diffraction light of the grating, as shown in for example FIG. 5.

Figure 6:
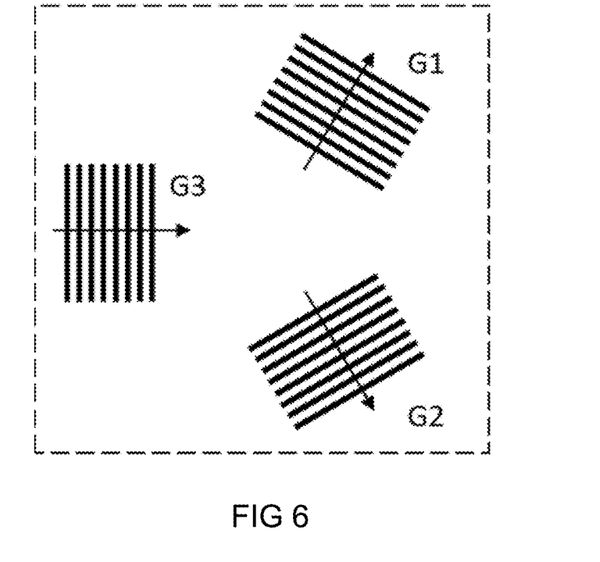
FIG. 6 shows a schematic diagram of the vector direction of an alternative two-dimensional grating.

FIG. 6 schematically shows an alternative example of the grating vector of the second coupling-out grating 135. A two-dimensional grating consists of optical structures in two-dimensional periodical arrangement in a plane. In the illustrated example, the two-dimensional coupling-out grating is a grating including optical structure in a hexagonal arrangement, has a first grating vector G1, a second grating vector G2 and a third grating vector G3 (see the arrows shown in the figure), and can be equivalent to the superposition of three one-dimensional gratings as shown in the figure. In the illustration, the grating vectors G1, G2, and G3 are drawn separately for the sake of clarity, but it should be understood that the above three grating vectors exist/form simultaneously at any part of the second coupling-out grating 135. It is to be understood that the second coupling-out grating 135 in use of the second coupling-out region 132 of the diffractive optical waveguide according to an embodiment of the present invention is not limited to the grating including optical structure in a hexagonal arrangement, nor limited to the grating having three grating vectors.

Wherein, in any two neighboring transitional coupling-out gratings in a direction parallel to the first direction D1, the first included angle corresponding to the one closer to the second coupling-out grating 135 is greater than the first included angle corresponding to the farther one. Or, in any two neighboring transitional coupling-out gratings in a direction parallel to the first direction D1, the second included angle corresponding to the one closer to the second coupling-out grating 135 is greater than the second included angle corresponding to the farther one. Or both of the above cases occur simultaneously. With the change of these angles, the shape of the transitional coupling-out grating is more and more like a two-dimensional grating in the first direction D1 from the side closer to the first coupling-out grating 134 to the side closer to the second coupling-out grating 135.

Figure 4:
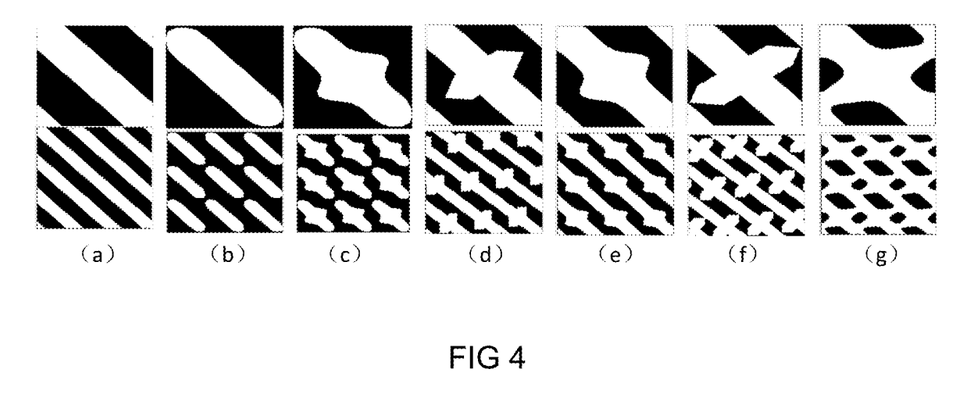
FIG. 4 shows a schematic diagram of the transition from one-dimensional grating to two-dimensional grating.
Figure 5:
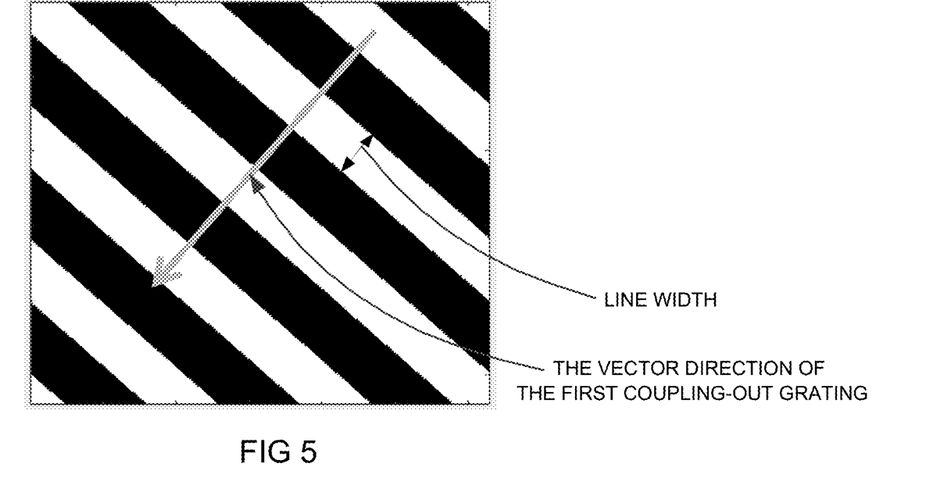
FIG. 5 shows a schematic diagram of the vector direction of one-dimensional grating.

Exemplarily, in the direction approaching the second coupling-out grating 135, the first included angle and the second included angle of the transitional coupling-out grating can gradually increase, so that the closer to the second coupling-out grating 135, the more like two-dimensional that the transitional coupling-out grating is; the closer to the first coupling-out grating 134, the more like one dimensional that the transitional coupling-out grating is. For example, as shown in FIG. 4, it shows an alternative change for a plurality of transitional coupling-out gratings. In FIG. 4, the leftmost (a) is a one-dimensional grating, and the rightmost (g) is an alternative two-dimensional grating; (b), (c), (d), (e) and (f) therebetween are several transitional coupling-out gratings that gradually change. Alternatively, (b), (c), (d), (e), and (f) may correspond to the first transitional coupling-out grating 136, the second transitional coupling-out grating 137, and the third transitional coupling-out grating 138, the fourth transitional coupling-out grating 139 and the fifth transitional coupling-out grating 140, respectively. As a result, with the transitional region between the one-dimensional first coupling-out grating 134 and the two-dimensional second coupling-out grating 135, it is possible to have gradual diffraction efficiency and coupling-out efficiency, and to weaken or even eliminate the emergence of the demarcation for bright and dark areas.

In another alternative embodiment, the third vector direction is at a predetermined angle with the second direction D2. The first vector direction 141 of each transitional coupling-out grating is at a first angle with the second direction D2, and the second vector direction 142 of each transitional coupling-out grating is at a second angle with the second direction D2, wherein the first angle is not greater than the predetermined angle and is greater than 10 degrees, and the second angle is less than 120 degrees and is not less than the predetermined angle. In some embodiments, the first angle is not greater than the predetermined angle and is greater than 30 degrees. Other suitable angle ranges are also applicable.

In an alternative embodiment, in any two neighboring transitional coupling-out gratings in the direction parallel to the first direction D1, the first angle corresponding to the one closer to the second coupling-out grating 135 is less than the farther one. Or, in any two neighboring transitional coupling-out gratings in the direction parallel to the first direction D1, the second angle corresponding to the one closer to the second coupling-out grating 135 is greater than the second angle corresponding to the farther one. Or both of the above cases occur simultaneously.

Figure 7:
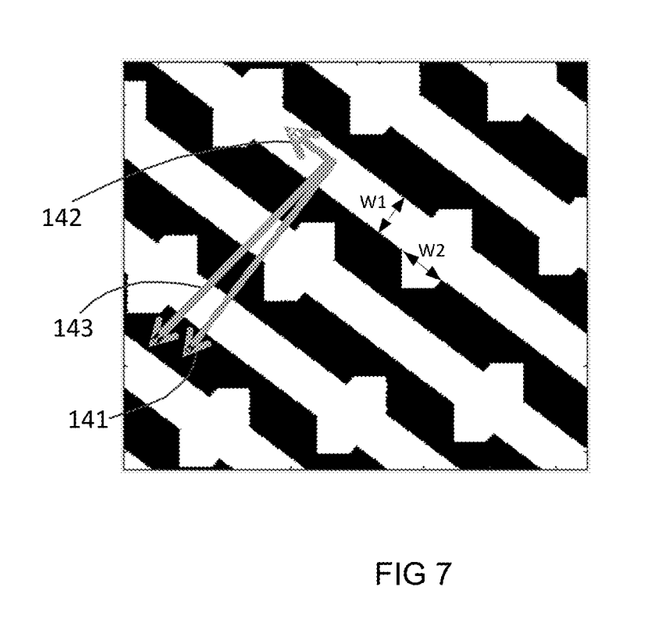
FIG. 7 shows a schematic diagram of the vector direction of the transitional coupling-out grating.

In a preferred embodiment, referring to FIG. 7, each periodic structure of the transitional coupling-out gratings has two features, i.e., a first grating feature and a second grating feature connected to the first grating feature. Wherein, the first grating feature has a first width W1 in a direction parallel to the first vector direction 141, and the second grating feature has a second width W2 in a direction parallel to the second vector direction 142. Preferably, the first width W1 is 0.7 times to 1.3 times the line width of the grating lines of the first coupling-out grating 134 (shown in FIG. 5), and the second width W2 is 0.7 times to 1.3 times the line width of said grating lines. Alternatively, each periodic structure may further include a third grating feature, wherein the second grating feature and the third grating feature can be connected to the first grating feature and located on either side of the first grating feature. In some embodiments, each periodic structure may also be in the shape of a polyline, and the polyline may have one bend or more than one bends.

In a preferred embodiment, the second coupling-out grating 135 has a first edge in its vicinity to the coupling-in grating, and has a second edge in its part farther away from the coupling-in grating. It can be understood that the first edge is opposite to the second edge. Wherein, the first edge has a first length in the first direction D1, and the coupling-in grating has a second length in the first direction D1. The first length can be not less than the second length.

In an alternative embodiment, the first edge can be chamfered. Preferably, the second edge can also be chamfered. Further preferably, at least one edge of the edges of the second coupling-out region is a curved edge. Alternatively, the shape of the second coupling-out region is any one of the shapes of: a rectangle (as shown in FIG. 1), a trapezoid, an isosceles triangle, a combination of a trapezoid and a rectangle, or may also be any other suitable shapes.

Figure 8:
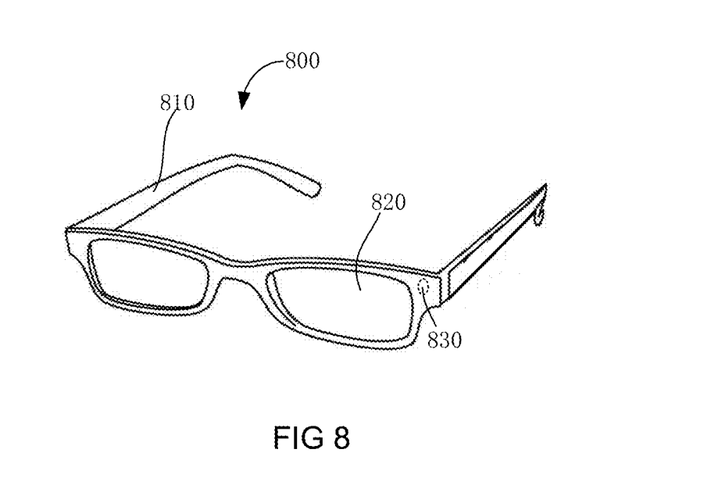
FIG. 8 shows a schematic diagram of an exemplary display device.

In another aspect, as shown in FIG. 8, the present application further provides a display device 800, which may comprise the aforementioned diffractive optical waveguide 100, wherein the description of the diffractive optical waveguide 100 can be referenced from the above and will not be repeated here.

The display device 800 can be any device comprising the aforementioned diffractive optical waveguide 100. As shown in FIG. 8, for example, the display device 800 can be a near-eye display device, which may comprise: a lens 820 and a frame 810 for holding the lens near eyes, the lens 820 including the diffractive optical waveguide 100.

According to the display device of the present application, it makes human eyes feel a more moderate change in brightness of light in different incident directions and brighter light in the field of view with wearing an optical waveguide display device, while avoiding a significant change in the brightness of the image observed by the human eyes movements in the eye box of the diffractive optical waveguide. This improves the display effect of the display device having the diffractive optical waveguide, and thereby improves the user's experience.

In some examples, as shown in FIG. 8, the display device may further comprise an optical machine 830. Alternatively, the optical machine 830 can project image light onto the diffractive optical waveguide 100, e.g., into the area where the coupling-in grating 120 of the diffractive optical waveguide 100 is located. Wherein, the optical machine 830 can be micro displays, such as a laser beam scanning (LBS), a digital light procession (DLP), a digital micromirror device (DMD), a liquid crystal on silicon (LCOS), a micro electromechanical system (MEMS), an organic light emitting diode (OLED), a Micro LED optical machine, or the like. The light emitted by the optical machine 830 is visible light.

Further, the display device can also comprise an actuating device for actuating the optical machine 830 to project image light onto the coupling-in grating 120 of the diffractive optical waveguide 100, wherein the actuating device can comprise an actuating circuit, which may include a MOSFET, a capacitor, a resistor or other suitable components. The display device can further comprise a controller that is electrically connectable to the actuating circuit. The actuating device is controlled via the controller to actuate the optical machine 830 to project image light onto the coupling-in grating 120 of the diffractive optical waveguide.

Alternatively, the area of the coupling-in region can be greater than or equal to the area of the light speckle projected by the optical machine 830 onto the coupling-in region. Alternatively, the optical axis of the image light projected by the optical machine 830 is perpendicular to the surface of the waveguide substrate 110 of the diffractive optical waveguide, so as to ensure the quality of the final image.

The light (e.g., image light) projected by the optical machine 830 onto the diffractive optical waveguide 100 is coupled-in to the waveguide substrate 110 via the coupling-in grating 120 and goes through total reflection and then coupled out. The light is coupled out through the coupling-out grating and enters the eyes of viewer wearing the near-eye device, thereby enabling the viewer to see the image projected by the optical machine 830.

In some embodiments, the display device is an augmented reality display device or a virtual reality display device, wherein the augmented reality display device includes but is not limited to the devices such as augmented reality (AR) glasses, an automotive head-up display (HUD), or the like.

It should be noted that the above-described embodiments are intended to illustrate but not limit the application, and alternative embodiments can be devised by those skilled in the art without departing from the scope of the appended claims. In the claims, any reference signs in parentheses shall not be construed as limiting the claim. The application can be implemented by means of hardware comprising several different elements as well as by means of a suitably programmed computer. In a unit claim listing several devices, some of these devices can be presented by the same one of hardware. The use of the words, such as first, second, and third, does not denote any order. These words can be interpreted as terms.

The invention claimed is:

1. A diffractive optical waveguide for optical pupil expansion, comprising:
   a waveguide substrate comprising a coupling-in region and a coupling-out region, wherein the coupling-out region includes a first coupling-out region, a second coupling-out region, and a transitional region, and the transitional region is disposed between the first coupling-out region and the second coupling-out region;
   a coupling-in grating disposed on or in the waveguide substrate and located in the coupling-in region and configured to couple input light into the waveguide substrate to cause the light to propagate within the waveguide substrate through total reflection;
   a coupling-out grating disposed on or in the waveguide substrate and located in the coupling-out region and configured to couple out at least a portion of light propagating therein from the waveguide substrate by diffraction, wherein,
   the coupling-out grating comprises a first coupling-out grating disposed in the first coupling-out region, a second coupling-out grating disposed in the second coupling-out region, and a plurality of transitional coupling-out gratings disposed in the transitional region; the first coupling-out grating includes a one-dimensional grating, the second coupling-out grating includes a two-dimensional grating, and the first coupling-out grating and the second coupling-out grating are arranged in a first direction; the transitional region comprises a plurality of sub-regions, and each sub-region is correspondingly provided with one of the transitional coupling-out gratings, wherein each of the transitional coupling-out gratings has a first vector direction, a second vector direction, and a third vector direction; the third vector direction of each of the transitional coupling-out gratings is parallel to the vector direction of the first coupling-out grating; the first vector direction and the third vector direction form a first included angle; the second vector direction and the third vector direction form a second included angle; in any two neighboring transitional coupling-out gratings in a direction parallel to the first direction, the first included angle corresponding to the one closer to the second coupling-out grating is greater than the first included angle corresponding to the farther one; and/or, in any two neighboring transitional coupling-out gratings in a direction parallel to the first direction, the second included angle corresponding to the one closer to the second coupling-out grating is greater than the second included angle corresponding to the farther one.

2. The diffractive optical waveguide of claim 1, wherein the second coupling-out grating has a first length in the first direction in its vicinity to the coupling-in grating, and the coupling-in grating has a second length in the first direction, wherein the first length is not less than the second length.

3. The diffractive optical waveguide of claim 1, wherein the third vector direction forms a predetermined angle with the second direction; the first vector direction of each of the transitional coupling-out gratings forms a first angle with the second direction, and the second vector direction of each of the transitional coupling-out gratings forms a second angle with the second direction, wherein the second direction is perpendicular to the first direction, the first angle is not greater than the predetermined angle and is greater than 10 degrees, and the second angle is less than 120 degrees and is not less than the predetermined angle.

4. The diffractive optical waveguide of claim 3, wherein in any two neighboring transitional coupling-out gratings in a direction parallel to the first direction, the first angle corresponding to the one closer to the second coupling-out grating is smaller than the first angle corresponding to the farther one, and/or, in any two neighboring transitional coupling-out gratings in a direction parallel to the first direction, the second angle corresponding to the one closer to the second coupling-out grating is greater than the second angle corresponding to the farther one.

5. The diffractive optical waveguide of claim 3, wherein the first angle is not greater than the predetermined angle and is greater than 30 degrees.

6. The diffractive optical waveguide of claim 1, wherein the first coupling-out grating comprises a plurality of grating lines; each of the transitional coupling-out gratings is composed of a plurality of periodic structures in periodical arrangement; each of the periodic structures comprises a first grating feature and a second grating feature connected to the first grating feature, wherein the first grating feature has a first width in a direction parallel to the first vector direction and the second grating feature has a second width in a direction parallel to the second vector direction.

7. The diffractive optical waveguide of claim 6, wherein the first width is 0.7 times to 1.3 times a line width of the grating lines;
the second width is 0.7 times to 1.3 times the line width of the grating lines.

8. The diffractive optical waveguide of claim 1, wherein the shape of the second coupling-out region is any one of: a rectangle, a trapezoid, an isosceles triangle, or a combination of a trapezoid and a rectangle.

9. The diffractive optical waveguide of claim 1, wherein the second coupling-out region is chamfered at a first edge in its vicinity to the coupling-in grating; and/or
the second coupling-out region further has a second edge opposite to the first edge, and the second coupling-out region is chamfered at the second edge; and/or
at least one edge of the second coupling-out region is a curved edge.

10. The diffractive optical waveguide of claim 1, wherein the number of the first coupling-out region is two; the two first coupling-out regions are disposed on either side of the second coupling-out region; the transitional region is provided between each first coupling-out region and the second coupling-out region.

11. The diffractive optical waveguide of claim 10, wherein the two first coupling-out regions are symmetrical with respect to a central axis of the second coupling-out region, and the central axis is perpendicular to the first direction.

12. The diffractive optical waveguide of claim 1, wherein the transitional coupling-out grating comprises a plurality of grating polylines, and each of the grating polylines comprises a plurality of periodic structures in continuous and connected arrangement; at least one edge of the periodic structures is a non-linear edge, and the shape of the non-linear edge is one of: a polyline, an arc, or a combination of a straight line and an arc.

13. A display device, comprising: the diffractive optical waveguide of claim 1, an optical machine, and an actuating device, wherein the actuating device is configured to actuate the optical machine to project image light onto the coupling-in grating of the diffractive optical waveguide.

14. The display device of claim 13, wherein an optical axis of the image light projected by the optical machine is perpendicular to a surface of the waveguide substrate of the diffractive optical waveguide.

15. The display device of claim 13, wherein the display device is a near-eye display device, comprising: a lens and a frame for holding the lens near eyes, the lens including said diffractive optical waveguide.

16. The display device of claim 13, wherein the display device is an augmented reality display device or a virtual reality display device.

* * * * *